United States Patent [19]
Leonard et al.

[11] Patent Number: 5,304,331
[45] Date of Patent: Apr. 19, 1994

[54] METHOD AND APPARATUS FOR EXTRUDING BINGHAM PLASTIC-TYPE MATERIALS

[75] Inventors: William K. Leonard, River Falls, Wis.; Donley D. Rowenhorst, Maplewood, Minn.; Jerald A. Scherger, Hudson, Wis.; Donald R. Winberg, St. Paul Park, Minn.

[73] Assignee: Minnesota Mining and Manufacturing Company, St. Paul, Minn.

[21] Appl. No.: 991,996

[22] Filed: Dec. 17, 1992

Related U.S. Application Data

[63] Continuation-in-part of Ser. No. 918,360, Jul. 23, 1992, and Ser. No. 919,179, Jul. 23, 1992, Pat. No. 5,201,916, and Ser. No. 919,180, Jul. 23, 1992.

[51] Int. Cl.⁵ .................................................. B29B 9/10
[52] U.S. Cl. ..................................... 264/141; 51/309; 264/144; 264/211.11; 425/308; 425/377; 425/382.3; 425/461; 425/467
[58] Field of Search ............... 264/211.11–211.12, 264/177.11–177.12, 118, 108, 140–144; 425/382 R, 463, 464, 382.3, 466, 461, 376.1, 377, 308, 467; 51/309

[56] References Cited

U.S. PATENT DOCUMENTS

| | | | |
|---|---|---|---|
| 2,229,422 | 1/1941 | Schade et al. | 425/376.1 |
| 2,904,827 | 9/1959 | Kaiser et al. | 18/1 |
| 3,137,895 | 6/1964 | Kusch | 425/382 R |
| 3,227,136 | 1/1966 | Bartlett et al. | 118/410 |
| 3,374,300 | 3/1968 | Azuma | 425/382 R |
| 3,387,957 | 6/1968 | Howard | 51/298 |
| 3,479,989 | 11/1969 | Hunter et al. | 118/608 |
| 3,972,666 | 8/1976 | Pandur | 425/461 |
| 4,150,078 | 4/1979 | Miller et al. | 264/211.11 |
| 4,341,663 | 7/1982 | Derleth et al. | 264/118 |
| 4,364,888 | 12/1982 | Levin | 264/177.12 |
| 4,393,021 | 7/1983 | Eisenberg et al. | 264/141 |
| 4,559,104 | 12/1985 | Eriksson | 425/466 |
| 4,848,041 | 7/1989 | Kruschke | 51/309 |
| 4,854,847 | 8/1989 | Mendoza | 425/382.3 |
| 5,090,968 | 2/1992 | Pellow | 51/293 |

FOREIGN PATENT DOCUMENTS

| | | | |
|---|---|---|---|
| 0168606 | 1/1986 | European Pat. Off. | C04B 35/10 |
| 3615782 | 9/1968 | Japan . | |
| 4216436 | 9/1969 | Japan . | |
| 46-14149 | 4/1971 | Japan | B29D 25N12 |
| 49-10145 | 3/1974 | Japan | B29D 27/00 |
| 53-132060 | 11/1978 | Japan | B29D 7/02 |

OTHER PUBLICATIONS

"Recent Operational Experiment with Screw-Die Extruder"; Morohashi et al.; Japan Plastics; pp. 21–26; Jul., 1970.

*Primary Examiner*—Jeffery Thurlow
*Attorney, Agent, or Firm*—Gary L. Griswold; Walter N. Kirn; Peter L. Olson

[57] ABSTRACT

The present invention relates to an apparatus and method for extruding a Bingham plastic-type material through a die having an auger rotationally mounted therein.

19 Claims, 6 Drawing Sheets

METHOD AND APPARATUS FOR EXTRUDING BINGHAM PLASTIC-TYPE MATERIALS

This is a continuation-in-part of application Ser. Nos. 07/918,360, 07/919,179 (now U.S. Pat. No. 5,201,916, issued Apr. 13, 1993), and 07/919,180, each of which was filed on Jul. 23, 1992.

TECHNICAL FIELD

This invention relates to extruding Bingham plastic-type materials, and specifically to a method and apparatus for extruding such materials in a uniform sheet.

BACKGROUND OF THE INVENTION

Extruding generally involves forcing a deformable material in a continuous stream through a die to form a profiled extrusion. An example of a conventional extruder is shown in FIG. 1. Extruder 10 generally includes a body 12 having a longitudinal bore 14 therein where the material 30 to be extruded enters the apparatus from a supply 16 of such material. An auger 18 is then rotated to force material 30 along the length of bore 14 and through a die opening 20 located at the distal end of bore 14 to form a profiled extrusion. For example, a continuous sheet may be extruded through a die having a slot-shaped profile corresponding to the desired width and thickness of the sheet, as shown in FIG. 1. The extrusion may then be processed as desired.

Some materials are more easily extruded than other materials. For example, a Newtonian fluid such as a petroleum oil may flow through the extruder die more easily and more uniformly than a Non-newtonian fluid such as a paste, clay, or gel. The present invention relates to extrusion of materials known as Bingham plastic-type materials, which exhibit a yield stress that must be exceeded before the material will deform. Stated differently, at relatively low stress levels the material will behave as a solid, and above the yield stress the material will deform. Bingham plastic-type materials include, but are not limited to materials such as gels, pastes, sol gel ceramic precursors, silicas, and clays.

When Bingham plastic-type materials are extruded through a conventional die having an elongate die opening, the results are not uniformly satisfactory. For example, the Bingham plastic-type material may channel, meaning that it flows from less than the entire width of the die, because there is insufficient localized pressure to force the material to the outer edges of the die opening. Channeling thus results in a nonuniform sheet. Furthermore, the extrusion of Bingham plastic-type materials requires a powerful pumping device to induce flow of the material through the die opening by exceeding the yield stress of the material.

One attempt to solve the problems described above was the use of multiple extruders 10 operating simultaneously and extruding material through a single die 20', as shown in FIG. 2. Although this approach has some utility from the standpoint of sheet uniformity, multiple extruders are expensive to purchase, operate, and maintain, and they occupy proportionately more floor space in the shop. The material extruded from each extruder may still channel, resulting in a non-uniform sheet as discussed above with reference to a single extruder.

It is therefore desirable to provide a reliable, inexpensive method and apparatus for extruding a uniform sheet from a Bingham plastic-type material.

SUMMARY OF THE INVENTION

The present invention includes a method of extruding a Bingham plastic-type material, comprising the steps of providing a die body having a longitudinal bore including a longitudinal axis, and a feed port communicating the exterior of the die body with the bore, the die body including a die passageway formed therein and communicating with the bore along the length thereof; providing at least one die opening communicating the die passageway with the exterior of the die body; rotationally supporting an auger within the bore, the rotational axis of the auger parallel to the longitudinal axis of the bore, the auger adapted to convey the material from the feed port to the die passageway and to maintain on average a zero pressure gradient along the longitudinal axis of the bore to provide a uniform flow of material through said passageway; supplying the material under pressure through the feed port and into the bore; and rotating the auger with respect to the die body to advance the material along the length of the auger, through the die passageway, and through the die opening. In one embodiment, the method further comprises the steps of conveying an endless belt adjacent the die opening such that the material is uniformly extruded onto the belt, the belt having a plurality of shaped apertures therein; urging the material against the belt to depress the material into the apertures; heating the material within the belt to form a plurality of abrasive precursor particles; and removing the particles from the belt. One type of material having particular utility when used in conjunction with the present method is a sol gel ceramic precursor.

In another aspect of the present invention, an apparatus is provided for receiving and extruding a quantity of a Bingham plastic-type material. The apparatus comprises a die body having a longitudinal bore and a feed port communicating the exterior of said die body with said bore; a supply of Bingham plastic-type material communicating with said feed port; a die passageway formed in said die body and communicating with said bore along the length thereof; at least one die opening communicating said die passageway with the exterior of said die body; and an auger rotationally supported within said bore for conveying the material from said feed port to said die passageway and through said die opening responsive to rotation of the auger with respect to the die body, said auger further adapted to maintain on average a zero pressure gradient along the longitudinal axis of the bore to provide a uniform flow of material through said passageway. In another embodiment, the apparatus includes an endless belt having a plurality of shaped apertures formed therein, said belt supported adjacent said die opening for receiving the material within said apertures; wiper blades for urging the material into the apertures; and an oven for heating the material within the belt to form a plurality of abrasive precursor particles.

BRIEF DESCRIPTION OF THE DRAWINGS

The invention will be more readily understood with reference to the accompanying drawings, wherein like reference numerals refer to like components throughout the several views, and wherein.

DETAILED DESCRIPTION OF THE INVENTION

The present invention has particular utility with respect to the extrusion of a uniform layer of sol gel ceramic precursor onto an endless belt having apertures therein to form abrasive precursor particles. This process is described further in commonly assigned parent copending U.S. patent application Ser. Nos. 07/918,360, 07/919,179, and 07/919,180, the disclosures of which are incorporated by reference herein. The process is shown schematically in FIG. 8 and described further below. Although the present invention should be understood to have particular utility with regard to sol gel ceramic precursor (hereinafter "sol gel"), the invention will be described in terms of its broader applicability to Bingham plastic-type materials.

Figure 1:
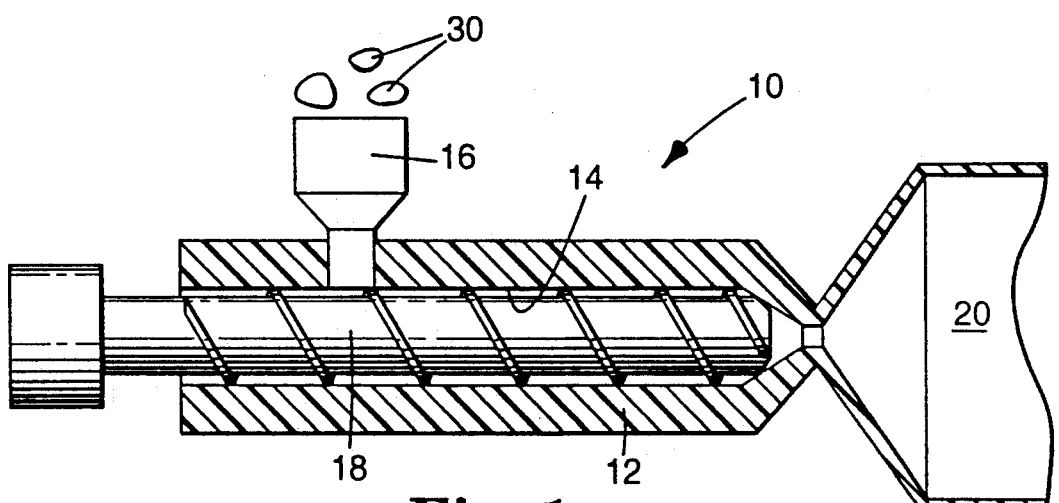
FIG. 1 is a sectional view of a single extruder according to the prior art.
Figure 2:
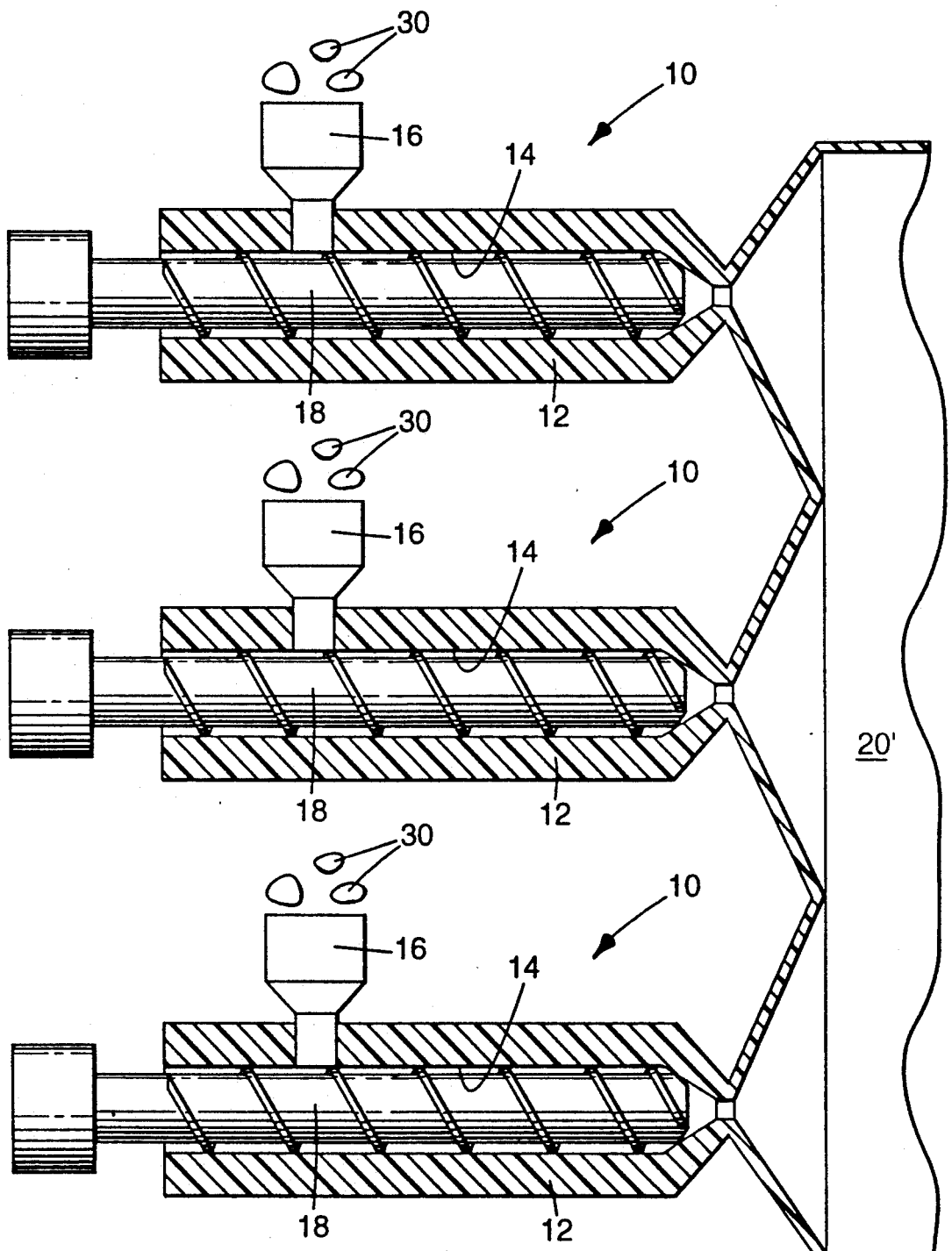
FIG. 2 is a sectional view of multiple extruders ganged together to extrude a single sheet member according to the prior art.
Figure 3:
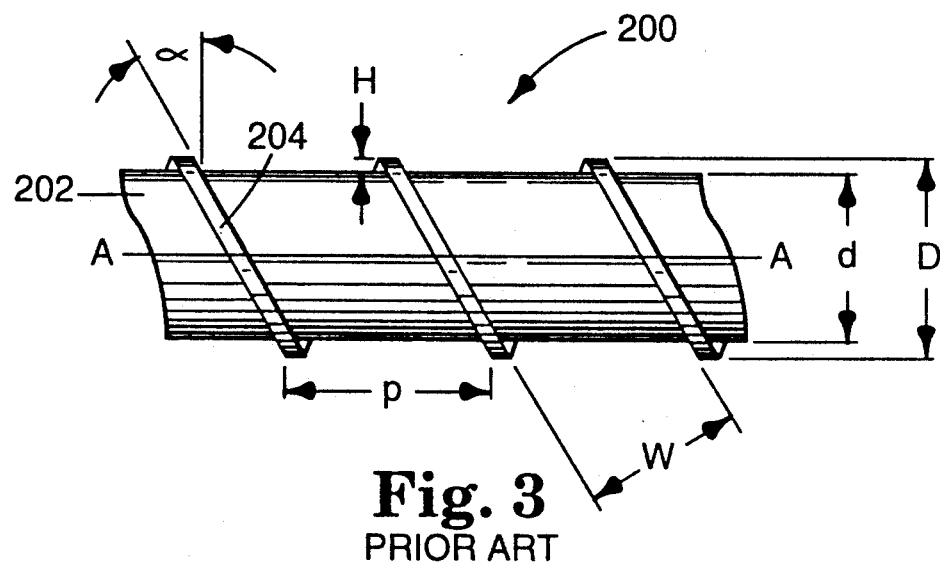
FIG. 3 is a portion of an auger according to the prior art.

The present invention will be better understood in comparison to a conventional auger, an example of which is shown at 200 in FIG. 3. Auger 200 includes a longitudinal root 202 and a helical flight 204 projecting from root 202 along the length thereof. Root 202 has a constant diameter "d," and helical flight 204 has a constant flight depth "H." The flight diameter "D" is constant over the length of auger 200, and thus $D = H + H + d$. Three other parameters also describe auger 200. The pitch "p" represents the maximum possible forward travel of material conveyed by auger 200 per revolution. The helix angle "α" indicates the inclination of flight 204 with respect to a perpendicular to the central axis A—A of the auger, and may be calculated by the formula: $\alpha = \tan^{-1}(p/\pi D)$. Helix angle $\alpha$ may be in the approximate range of 10° to 45°, depending on the application. The width "W" of each channel is constant, and is measured perpendicular to flight 204.

Figure 4:
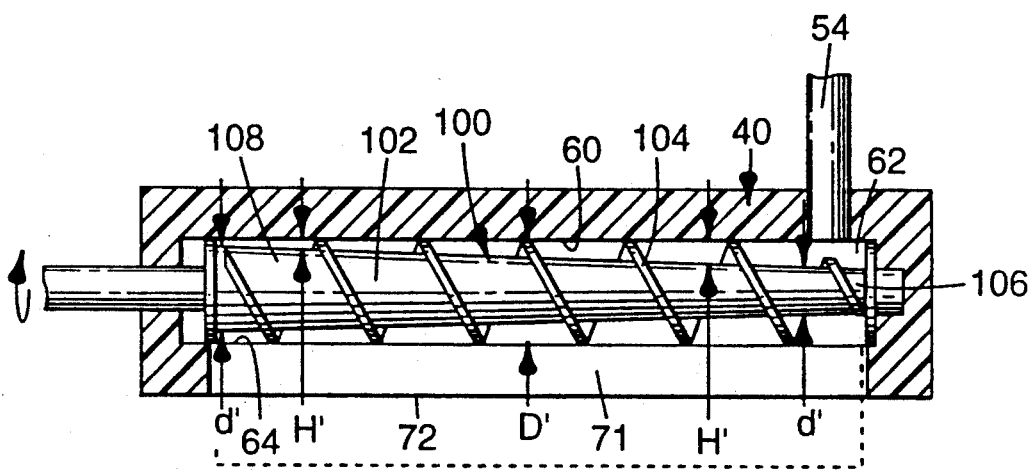
FIG. 4 is a sectional view of an auger disposed within a die according to the present invention.

Auger means for conveying Bingham plastic-type material is provided, and is shown in the illustrated embodiment as auger 100. As shown in FIG. 4, auger 100 varies from the conventional auger described above in several regards. Root 102 has a diameter "d'" that increases from first end 106 to second end 108 of auger 00. Flight 104, which is preferably helical, has a flight diameter "H'" that decreases from first end 106 to second end 108. The preferred flight depth at second end 108 is approximately 1/5 (or less) of the flight depth at first end 106. The flight diameter "D'" is constant over the length of auger 100, and thus $D' = H' + H' + d'$, where d' is the root depth. The material conveying capacity of auger 100 thus gradually decreases along the length of the auger due to the gradually decreasing flight depth. In the preferred embodiment, the flight depth decreases linearly along the length of the bore 60. The ratio of the bore length to the bore diameter (L/D) is preferably between 3.0 and 60.0.

A feature of the present invention is the relative positions of auger 100 with respect to die passageway 71 and die opening 72, as shown in FIG. 4. Conventional extruders typically include an auger and a die opening adjacent the distal end of the auger, whereas the extruder of the present invention includes one or more die passageways that communicate with the central bore along the length thereof, and with one or more die openings at the exterior of the die body. Specifically, die body 40 includes a longitudinal bore 60 therein having first and second ends 62 and 64, respectively. Feed port 54 communicates the exterior of die body 40 with bore 60 adjacent first end 62. Auger 100 includes first and second ends 106 and 108, respectively, and is disposed within bore 60 and adapted for rotational motion therein. Adjacent and extending along the length of bore 60 is die passageway 71, which communicates with bore 60 and with one or more die openings 72 that open to the exterior of die body 40. In the illustrated embodiments, die passageway 71 communicates with bore 60 continuously along the length of the bore. However, die passageway 71 could instead communicate with bore 60 at spaced locations along bore 60. In use, the material is transported along bore 60 by the rotation of auger 100, forced through die passageway 71 along the length of bore 60, and extruded through die opening 72.

Figure 5:
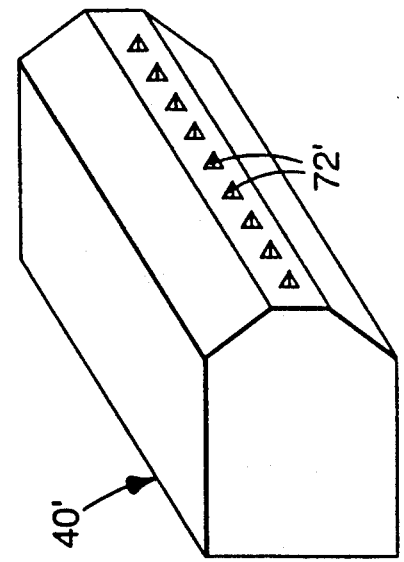
FIG. 5 is a second embodiment of a die body according to the present invention.

In the preferred embodiment, die body 40 includes a single elongate longitudinally extending die opening 72 that is adapted to form a uniform sheet member having a width substantially in excess of its thickness. The sheet member is illustrated schematically by the phantom lines shown in FIGS. 4 and 6. The combination of the position of die opening 72 relative to auger 100 and the configuration of auger 100 tends to produce a uniform extruded sheet of material. In other embodiments, different numbers and configurations of die passageways and die openings may instead be provided. For example, FIG. 5 illustrates a die body 40' having a plurality of die openings 72', which are adapted to form a like plurality of rods of extruded material when used in conjunction with the present invention. Other die passageway and die opening configurations are also contemplated.

It is preferred that the "material conveying capacity" of the auger at any axial position along the auger varies linearly from maximum at the first end to a minimum at the second end. The "material conveying capacity" is defined as the volumetric conveying rate of material through the bore per revolution of the auger while maintaining on average a zero pressure gradient along the longitudinal axis of the bore. By maintaining a zero pressure gradient along the length of the bore, the material is conveyed uniformly into die passageway 71 and through die opening 72. In the preferred embodiment, the flight depth varies linearly from first end 106 to second end 108 as shown in FIG. 4, and thus the drag flow capacity varies linearly. It should be noted that the geometry of the system may be changed in many ways to produce a zero pressure gradient along the length of the bore. For example, bore 60 could be formed in a noncylindrical shape (e.g. conical), and an appropriately modified auger could be provided to match the contour of bore 60. Auger 100 could also be modified to have a nonlinear variation in root taper, flight depth, or both, by changing the pitch p or the helix angle α along the length of the auger. In each of these nonlimiting examples, the geometric parameters of the bore and auger may be varied to effect a zero pressure gradient along the length of the bore. The zero pressure gradient, as described above, tends to produce a uniform discharge of material from die opening 72, which is a feature of the present invention.

Figure 6:
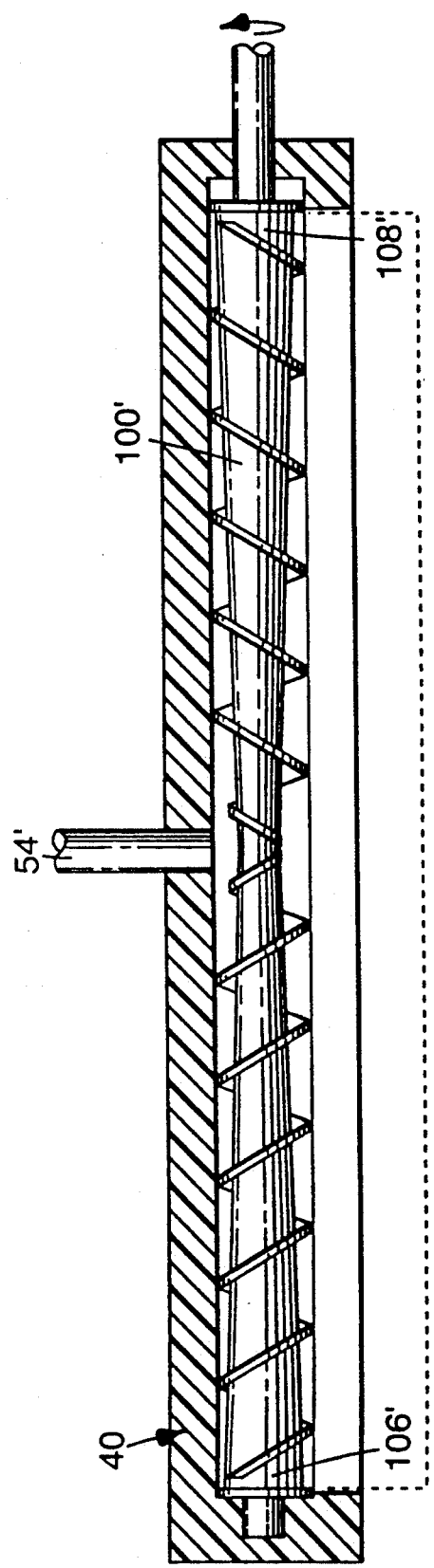
FIG. 6 is a second embodiment of an auger disposed within a die body according to the present invention.

In other embodiments the apparatus of the present invention may include a feed port that is located at some point intermediate the first and second ends 106 and 108. The auger 100 could be adapted as shown in FIG. 6 to convey material from feed port 54' toward first and second ends 106' and 108' of auger 100', respectively, by providing a tapered root and flight as generally described above. In another embodiment, multiple feed ports could also be provided instead of the single feed port shown, and each feed port could be adapted to direct the material toward a portion of auger 100.

Referring again to FIG. 4, means for rotating auger 100 (shown in FIG. 7 as motor 74) rotates auger 100 within bore 60 to move the material along the bore from first end 62 to second end 64, and to extrude the material through die passageway 71 and die opening 72 in sheet form. The proper rotational speed of auger 100 may be experimentally determined to provide the desired uniform rate of extrusion by maintaining a zero pressure gradient along the length of the bore for a given material. If auger 100 is rotated too slowly, excess material may be discharged through the portion of die opening nearest first end 106 of auger 100. Similarly, if auger 100 is rotated too quickly, excess material may be discharged through the portion of die opening 72 nearest second end 108 of auger 100. At the proper rotational velocity, the pressure gradient along bore 60 is zero, and tends to force a sheet of uniform thickness through die opening 72. Thus the proper rotational speed is important to the operation of the apparatus of the present invention, and generally is less than 1,000 revolutions per minute. Although it has not been experimentally verified, it is believed that the following expression may provide an approximate range of acceptable rotational speeds:

$$\frac{Q}{WF\pi D\cos(\alpha)} < N < \frac{4Q}{WF\pi D\cos(\alpha)}$$

Wherein:
N = Rate of rotation (rev./min)
W = Bore width (cm)
Q = Volumetric flow rate at feed port (cm$^3$/min)
F = Flight depth at feed port (cm)
D = Flight diameter (cm)
$\alpha$ = Helix angle (degrees)

Figure 7:
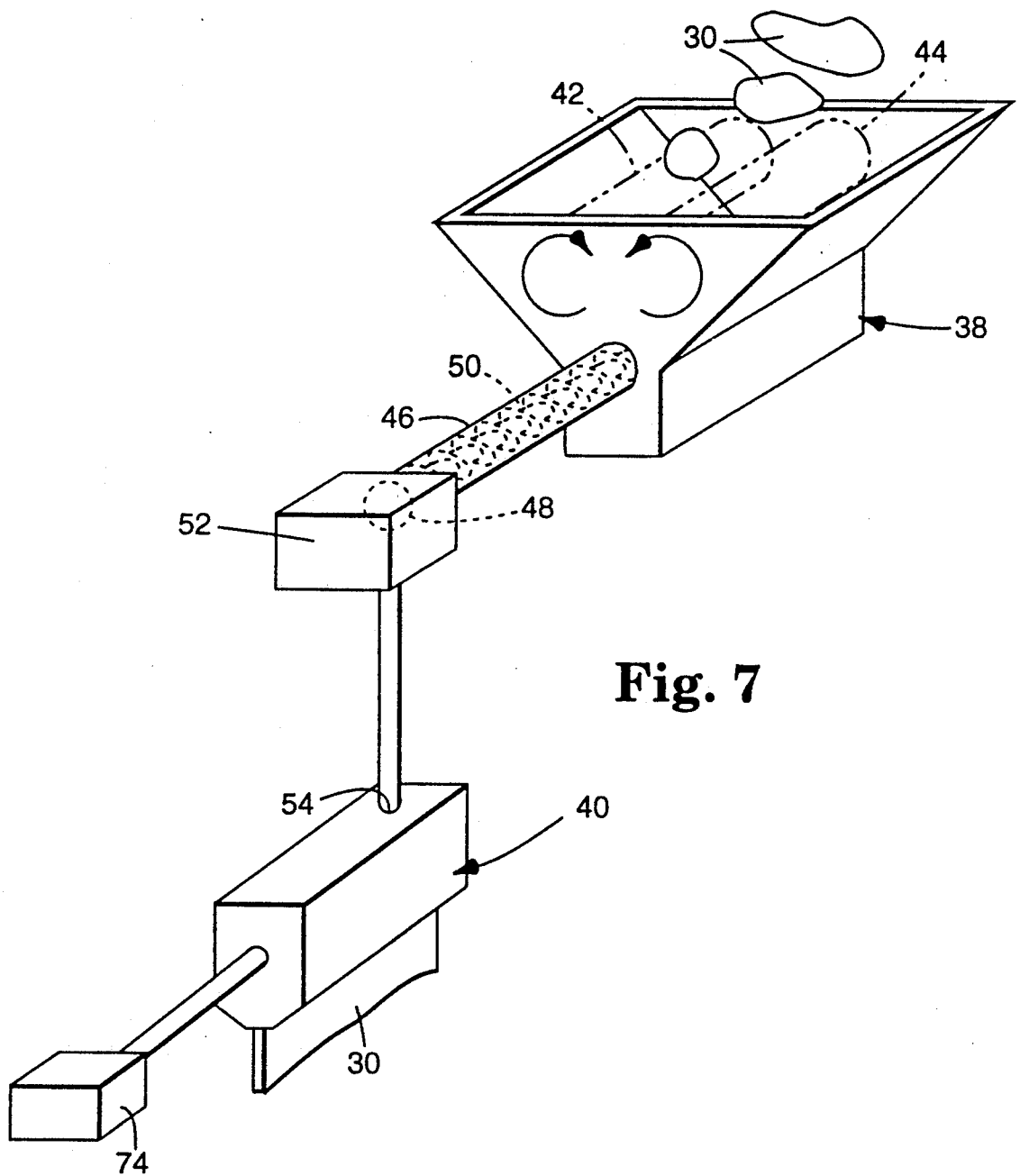
FIG. 7 is a schematic representation of an apparatus for extruding material according to the present invention.

The operation of the present invention will now be described with reference to the process for forming abrasive particles discussed above. As shown in FIG. 7, material 30 is provided to supply means 38 for delivery to die body 40. Supply means 38 could comprise a combination kneader and extruder, which includes twin, counter-rotating mixing blades 42 and 44 that mix and pack material 30 into an auger channel 46 for delivery through exit port 48 by a supply auger 50. Mixing and packing material 30 aids in preventing voids that may produce a nonuniform sheet. Exemplary of such a combination kneader and extruder is a Model D/A Mixer manufactured by the Teledyne Readco Co. of York, Pa.

Figure 8:
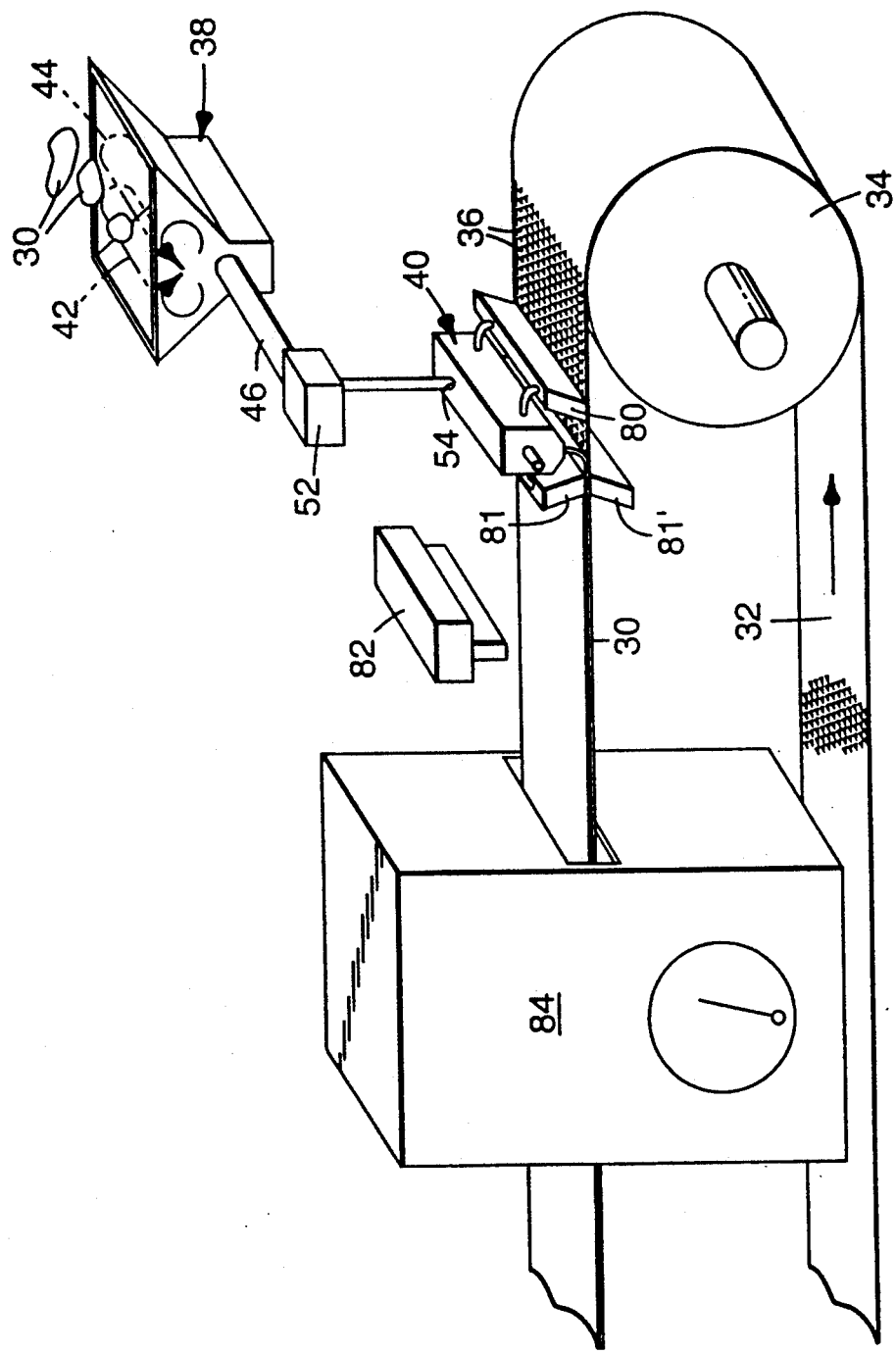
FIG. 8 is a schematic representation of a process for making abrasive precursor particles by extruding material onto an endless belt.

As shown in FIGS. 7 and 8, exit port 48 is connected to a pump 52, which pressurizes material 30 and supplies it to feed port 54 of die body 40. Pump 52 may be a Moyno TM type pump available from the Robbins & Meyers Co. of Springfield, Ohio, and preferably pressurizes material 30 to a pressure of approximately $6.9 \times 10^5$ to $2.76 \times 10^6$ N/m$^2$ (100 to 400 psi) to insure delivery to feed port 54.

As shown in FIG. 8, material 30 is extruded onto endless belt 32, which is driven by sprocket 34 and includes a plurality of apertures 36 formed therein corresponding to the desired shape of the abrasive particles. For example, the belt may include triangular, circular, square, or diamond shaped apertures, or some combination thereof. Wiper blades 80 and 81 are preferably attached to body 40, and wiper blades 81 and 81' are preferably opposed and aligned. Wiper blades 80, 81, and 81' and levelling doctor blade 82 press material 30 into apertures 36, and smooth the material both on the top and the bottom of the belt prior to drying in an oven 84. When the drying process is complete, the dried particles are removed from belt 32 and may be further processed to produce abrasive particles suitable for use with an abrasive member. This process is also described in copending U.S. patent application Ser. Nos. 07/918,360, 07/919,179, now U.S. Pat. No. 5,201,916 and 07/919,180.

EXAMPLE

The operation of the method and apparatus of the present invention may be illustrated by the following non-limiting example. Sol gel comprising alpha aluminum oxide monohydrate powder (1,235 parts) having the trade designation "DISPERAL" and alpha iron oxide hydroxide (206 parts, 10% FeOOH) was dispersed by continuous mixing in a solution containing deionized water (3,026 parts) and 70% aqueous nitric acid (71 parts). The resultant sol was mixed with magnesium nitrate (429 parts) to form a gel that was dried at a temperature of approximately 125° C. in a continuous dryer to produce a dispersion containing 44% solids. The magnesium nitrate was 10.6% solids on an oxide basis. The sol gel was placed in the hopper of a D/A Mixer Serial No. 106527 available from the Teledyne Readco Co. of York, Pa. The sol gel was extruded from the D/A Mixer apparatus and fed to a Moyno TM pump Model No. 6M1SSF where it was pressurized to between $6.9 \times 10^5$ and $2.8 \times 10^6$ N/m$^2$ (100 and 400 psi) to insure proper flow to the die body.

The extruder included an auger having a length of 17.8 cm (7 in) and a flight diameter of 2.5 cm (0.97 in). The flight depth measured 0.36 cm (0.135 in) adjacent the feed port and linearly tapered to a flight depth of 0.076 cm (0.035 in) adjacent the second end of the auger. Thus the root measured approximately 1.8 cm (0.70 in) adjacent the feed port, and linearly increased to approximately 2.29 cm (0.90 in) adjacent the second end. The auger was powered by a Dayton Brand ¼ hp DC gearmotor operating at approximately 5 to 50 revolutions per minute. The bore measured approximately 2.54 cm (1.0 in), and communicated along the length of the auger with a die opening measuring approximately 0.23 cm (0.09 in) by 17.8 cm (7.0 in).

When the D/A Mixer, the Moyno TM pump, and the auger motor were activated, sol gel was supplied to and extruded from the die opening uniformly onto, into, and through the apertures of an endless belt. The belt was 0.05 cm (0.020 in) thick and included arranged equilateral triangularly shaped apertures, each side of which measured 0.29 cm (0.11 in). Doctor blades removed excess sol gel from the top and bottom surfaces of the belt, and a levelling doctor blade smoothed both the top and bottom surfaces of the belt and sol gel. The belt was passed through an oven, where the sol gel precursor particles were dried, and removed from the endless belt. The particles were generally uniformly sized, and were suitable for conversion to abrasive particles.

The present invention has now been described with reference to several embodiments thereof. It will be apparent to those skilled in the art that many changes can be made in the embodiments described without departing from the scope of the invention. Thus, the scope of the present invention should not be limited to the structures described herein, but only by structures described by the language of the claims and the equivalents of those structures.

We claim:

1. A method of extruding a Bingham plastic-type material, comprising the steps of:
   (a) providing a die body having a longitudinal bore including a longitudinal axis, and a feed port communicating the exterior of the die body with the bore, the die body including a die passageway formed therein and communicating with the bore along the length thereof;
   (b) providing at least one die opening communicating the die passageway with the exterior of the die body;
   (c) rotationally supporting an auger within the bore, the rotational axis of the auger parallel to the longitudinal axis of the bore, the auger adapted to convey said material from the feed port to the die passageway and to maintain on average a zero pressure gradient along the longitudinal axis of the bore to provide a flow of material through said passageway;
   (d) supplying said material under pressure through the feed port and into the bore;
   (e) rotating the auger with respect to the die body to advance said material along the length of the auger, through the die passageway, and uniformly through the die opening;
   (f) conveying an endless belt adjacent the die opening such that said material is uniformly extruded onto the belt, the belt having a plurality of shaped apertures therein;
   (g) urging said material against the belt to depress said material into the apertures;
   (h) heating said material within the belt to form a plurality of particles; and
   (i) removing the particles from the belt.

2. The method of claim 1, wherein the material is a sol gel ceramic precursor.

3. The method of claim 1, wherein step (e) comprises rotating the auger with respect to the die body at a rotational velocity N, wherein $$\frac{Q}{WF\pi D\cos(\alpha)} < N < \frac{4Q}{WF\pi D\cos(\alpha)}.$$

wherein N is the rate of rotation, W is the channel width, Q is the volumetric flow rate at feed port, F is the flight depth at feed port, D is the flight diameter, and $\alpha$ is the helix angle.

4. The method of claim 1, wherein step (e) comprises rotating the auger with respect to the die body at a rotational velocity of less than 1,000 revolutions per minute.

5. An apparatus for receiving and extruding a Bingham plastic-type material, comprising:
   (a) a die body having a longitudinal bore and a feed port communicating the exterior of said die body with said bore,
   (b) a supply of Bingham plastic-type material communicating with said feed port;
   (c) a die passageway formed in said die body and communicating with said bore along the length thereof;
   (d) least one die opening communicating said die passageway with the exterior of said die body;
   (e) auger means rotationally supported within said bore for conveying said material from said feed port to said die passageway and through said die opening responsive to rotation of the auger means with respect to the die body, said auger means further adapted to maintain on average a zero pressure gradient along the longitudinal axis of the bore to provide a uniform flow of material through said passageway and through said opening;
   (f) an endless belt having a plurality of shaped apertures formed therein, said belt supported adjacent said die opening for receiving said material within said apertures;
   (g) means for urging said material into the apertures; and
   (h) means for heating said material within the belt to form a plurality of particles.

6. The apparatus of claim 5, wherein said auger means comprises an auger having first and second ends, and a root and a flight adjoining said root and having a constant flight diameter, said root having a first root diameter at said first end of said auger and a second root diameter at said second end of said auger that is greater than said first root diameter.

7. The apparatus of claim 6, wherein said auger comprises a flight having a helix angle of between 10° and 45°.

8. The apparatus of claim 5, wherein said auger means comprises an auger having first and second ends, and a root and a helical flight adjoining said root and having a constant flight diameter, said root having a first root diameter adjacent said feed port and a second root diameter adjacent at least one of said first and said second end that is greater than said first root diameter.

9. The apparatus of claim 8, wherein said auger comprises a flight having a helix angle of between 10° and 45°.

10. The apparatus of claim 5, wherein said bore is cylindrical.

11. The apparatus of claim 10, wherein the ratio of the length of the bore to the diameter of the bore is between 3.0 and 60.0.

12. The apparatus of claim 5, wherein the material is transferred from said supply to said feed port by a combination mixer and extruder apparatus.

13. The apparatus of claim 5, wherein said apparatus further includes means for rotating said auger means with respect to said die body.

14. The apparatus of claim 13, wherein said rotating means comprises a motor.

15. The apparatus of claim 5, wherein said die opening is adapted to form a uniform sheet member having a width substantially in excess of its thickness.

16. The apparatus of claim 5, wherein the Bingham plastic-type material is a sol gel ceramic precursor.

17. The apparatus of claim 16, wherein said sol gel ceramic precursor comprises alpha aluminum oxide monohydrate and water.

18. The apparatus of claim 5, wherein said means for urging the material into the apertures comprises at least one wiper blade.

19. The apparatus of claim 5, wherein said heating means comprises an oven through which the endless belt is conveyed to heat the material.

* * * * *

UNITED STATES PATENT AND TRADEMARK OFFICE
CERTIFICATE OF CORRECTION

PATENT NO. : 5,304,331

DATED : April 19, 1994

INVENTOR(S) : William K. Leonard, Donley D. Rowenhorst, Jerald A. Scherger, and Donald R. Winberg It is certified that error appears in the above-indentified patent and that said Letters Patent is hereby corrected as shown below:

Col. 3, line 59, "00" should read --100--.

Signed and Sealed this

Eleventh Day of October, 1994

Attest:

BRUCE LEHMAN

*Attesting Officer*     *Commissioner of Patents and Trademarks*